(12) United States Patent
Wadekar et al.

(10) Patent No.: US 8,798,047 B1
(45) Date of Patent: Aug. 5, 2014

(54) METHODS AND SYSTEMS FOR PROCESSING NETWORK INFORMATION

(75) Inventors: Manoj Wadekar, San Jose, CA (US);
Bruce A. Klemin, Rocklin, CA (US);
Gaurav Agarwal, Los Altos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 300 days.

(21) Appl. No.: 13/220,249

(22) Filed: Aug. 29, 2011

(51) Int. Cl.
*H04L 12/56* (2006.01)
*H04L 12/54* (2013.01)
*H04L 29/06* (2006.01)
*H04J 3/16* (2006.01)

(52) U.S. Cl.
CPC ............ *H04L 12/56* (2013.01); *H04L 29/0653* (2013.01); *H04J 3/1682* (2013.01)
USPC ............ 370/389; 370/400; 370/401; 370/392

(58) Field of Classification Search
CPC ..... H04L 12/56; H04L 29/0653; H04J 3/1682
USPC ......... 370/401, 400, 465, 468, 469, 471, 474, 370/475, 392, 395.53, 389, 404
See application file for complete search history.

(56) References Cited

U.S. PATENT DOCUMENTS

| | | | |
|---|---|---|---|
| 7,420,991 B2 * | 9/2008 | Lok et al. | 370/474 |
| 2003/0115328 A1 * | 6/2003 | Salminen et al. | 709/225 |
| 2006/0047904 A1 * | 3/2006 | Rohde et al. | 711/114 |
| 2006/0098653 A1 * | 5/2006 | Adams et al. | 370/389 |
| 2006/0140181 A1 * | 6/2006 | Trumper et al. | 370/389 |

* cited by examiner

*Primary Examiner* — Ian N Moore
*Assistant Examiner* — Hien Nguyen
(74) *Attorney, Agent, or Firm* — Klein, O'Neill & Singh, LLP (57) ABSTRACT

The present embodiments support both tunneling and offload functionality for tunneled packet having a tunnel header, the tunnel header encapsulating a packet, the packet having a packet header and a payload. When a tunneled packet is received at a network device, an offset value for the packet header is determined by comparing the tunnel header to a plurality of entries stored at a data structure maintained by the network device. The offset value is used for pre-processing the packet, and an offload module of the network device performs an offload function.

17 Claims, 6 Drawing Sheets

METHODS AND SYSTEMS FOR PROCESSING NETWORK INFORMATION

TECHNICAL FIELD

The present embodiments relate to network communications.

BACKGROUND

A computer network, often simply referred to as a network, typically includes a group of interconnected computers and devices that facilitate communication between users and allow users to share resources. Adapters, switches and other devices are typically used during network communication. Continuous efforts are being made to improve network communication.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

One of the present embodiments comprises a machine implemented method. The method comprises receiving a tunneled packet at a network device. The tunneled packet has a tunnel header. The tunnel header encapsulates a packet. The packet has a packet header and a payload. The method further comprises determining an offset value for the packet header by comparing the tunnel header to a plurality of entries stored at a data structure maintained by the network device. The method further comprises using the offset value for pre-processing the packet. The method further comprises a hardware based offload module performing an offload function.

Another of the present embodiments comprises a network device coupled to a computing system. The network device comprises a hardware based offload system having a header parser for receiving a tunneled packet. The tunneled packet has a tunnel header. The tunnel header encapsulates a packet having a packet header and a payload. The network device further comprises an access module for determining an offset value for the packet header by comparing the tunnel header to a plurality of entries stored at a data structure maintained at the network device. The header parser uses the offset value for pre-processing the packet. The network device further comprises an offload module for performing an offload function.

Another of the present embodiments comprises a system. The system comprises a computing system interfacing with a network device. The network device comprises a hardware based offload system having a header parser for receiving a tunneled packet at a network device. The tunneled packet has a tunnel header. The tunnel header encapsulates a packet having a packet header and a payload. The network device further comprises an access module for determining an offset value for the packet header by comparing the tunnel header to a plurality of entries stored at a data structure maintained at the network device. The header parser uses the offset value for pre-processing the packet. The network device further comprises an offload module for performing an offload function.

Another of the present embodiments comprises a machine implemented method. The method comprises receiving a tunneled packet at a network device. The method further comprises an access module of the network device comparing a tunnel header of the received packet with a plurality of tunnel header entries stored at data structure accessible to the network device. The method further comprises if the tunnel header matches one of the stored tunnel header entries, providing a pointer corresponding to the matched tunnel header entry. The pointer points to an offset value that is equal to a packet offset of the tunneled packet. The method further comprises a loopback module of the network device sending the tunneled packet to a header parser of the network device with the offset value. The method further comprises the loopback module parsing the packet header. The method further comprises a checksum offload module of the network device determining a checksum for the tunneled packet. The method further comprises an offload module of the network device performing an offload function.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms logic, module, component, system and functionality represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

Figure 1A:
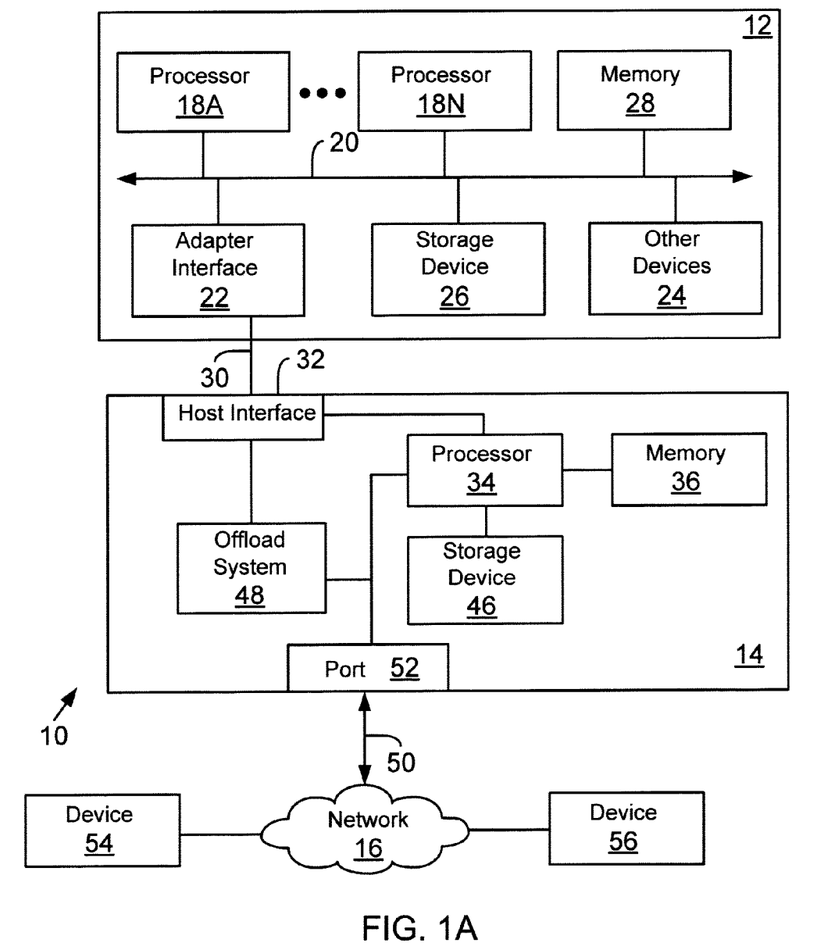
FIG. 1A shows a functional block diagram of a system, used according to one embodiment.

FIG. 1A is a block diagram of a system 10 configured for use with the various embodiments disclosed. System 10 includes a computing system 12 (may also be referred to as "host system 12") coupled to an adapter 14 that interfaces with a network 16 for communicating with other devices 54, 56. The network 16 may include, for example, additional computing systems, servers, storage systems and other devices. Adapter 14 may be configured to send and receive network traffic complying with one or more protocols/standards, for example, Ethernet, Gigabit Ethernet, Transmission Control Protocol (TCP), Internet Protocol(IP), Fibre Channel, Fibre Channel over Ethernet (FCOE), InfiniBand (IB), iSCSI, and others.

The computing system 12 may include one or more processors 18A-18N (referred to as processor 18), also known as hardware-based, central processing units (CPUs). Processor 18 executes computer-executable process steps out of a memory 28 and interfaces with an interconnect system 20, which may also be referred to as a computer bus 20. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of interconnect.

Memory 28 interfaces with computer bus 20 to provide processor 18 with access to memory storage. Processor 18 may execute programmable instructions out of memory 28. Memory 28 may include random access main memory (RAM). Read only memory (ROM, not shown) may also be used to store invariant instruction sequences, such as start-up instruction sequences or basic input/output system (BIOS) sequences for operation of a keyboard (not shown).

The computing system 12 may further include a storage device 26, which may be for example a hard disk, a CD-ROM, a non-volatile memory device (flash or memory stick) or any other device. Storage 26 may store operating system program files, application program files, and other files.

The computing system 12 also includes other devices and interfaces 24, which may include a display device interface, a keyboard interface, a pointing device interface, etc. The details of these components are not germane to the inventive embodiments.

Processor 18 interfaces with adapter 14 via an adapter interface 22 and a link 30 that is coupled to a host interface 32 of the adapter 14. In one embodiment, the host interface 32 may be a Peripheral Component Interconnect (PCI) Express interface coupled to a PCI Express link (for example, link 30).

Adapter 14 may include a processor 34 that executes firmware instructions out of memory 36 to control overall adapter 14 operations. Memory 36 may also store the process steps described below, according to one embodiment.

Adapter 14 may also include storage 46, which may be for example non-volatile memory, such as flash memory, or any other device. The storage 46 may store executable instructions and operating parameters that can be used for controlling overall adapter operations.

Adapter 14 includes a port 52 (or network interface 52) that interfaces with a link 50 for sending and receiving network traffic. In one embodiment, port 52 includes logic and circuitry for handling network packets, for example, Ethernet or any other type of network packets. Port 52 may include memory storage locations, referred to as memory buffers (not shown) to temporarily store information received from or transmitted to other network devices.

In one embodiment, adapter 14 also includes an offload system 48, which is a hardware resource that is used to perform certain functions typically performed by a host system component, for example processor 18 or any other component. As an example, offload system 48 may execute a network protocol stack, for example, a TCP/IP protocol stack for processing TCP/IP packets that are sent and received from other devices; perform a hashing function to select a processor for processing a received packet; or process iSCSI, FCOE and other packet types.

Figure 1B:
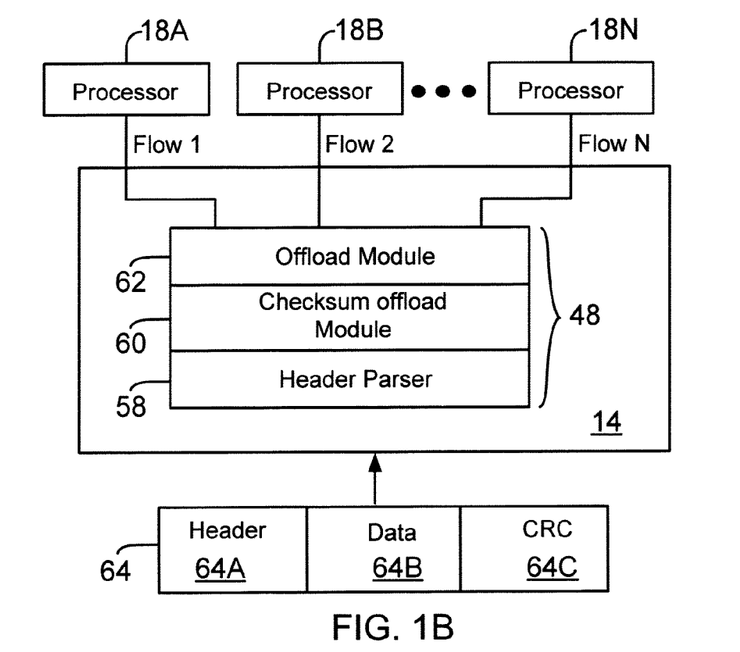
FIG. 1B shows an example of load balancing without tunneling.

FIG. 1B illustrates detailed components of offload system 48, according to one embodiment. Offload system 48 includes a header parser 58 (may also be referred to as a parsing module 58) that parses a header of a received packet. Typically, the packet is received for a connection that is maintained by adapter 14.

Offload system 48 may also include a checksum offload module 60 that performs a checksum on a packet header. The offload system 48 includes an offload module 62 for performing the offload function, typically, in hardware.

As described above, offload system 48 may be used to perform various functions. As an example, offload system 48 may be used for distributing received packets between CPUs 18A-18N. As an example, a packet 64 is received by header parser 58 for a connection. Packet 64 includes a header 64A, data (or payload) 64B and cyclic redundancy code (CRC) 64C. The format of packet 64 and header 64A is typically defined by the protocol/standard that may be used for a particular connection.

The header 64A is parsed by the header parser 58. The checksum offload module 60 performs a checksum on the packet header 64A. Thereafter, the offload module 62 is used to select a processor from among processors 18A-18N.

In one embodiment, offload module 62 performs a hashing function on header 64A and then selects a processor to process the packet. Thus, modules 58, 60 and 62 have to understand the structure of packet 64 to perform the offload function, which in this example, is selecting a processor from among processors 18A-18N.

Figure 1C:
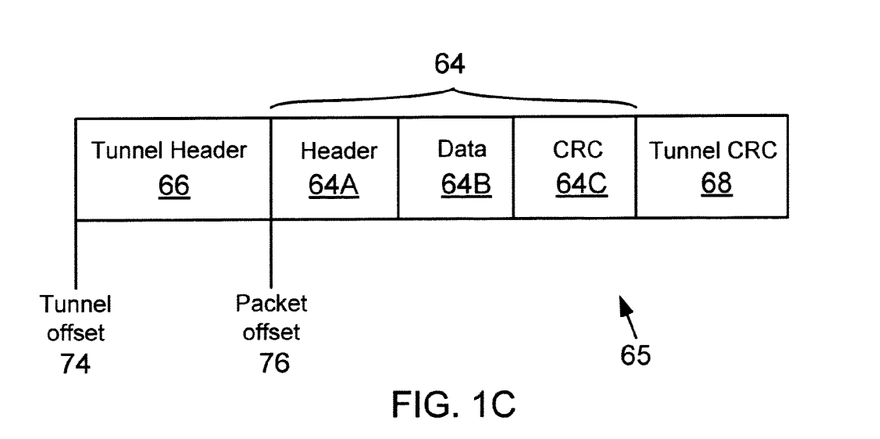
FIG. 1C shows an example of tunneling used in network communication.

FIG. 1C shows an example of tunneling for transmitting packet 64. Computer networks typically use a tunneling protocol when one protocol, for example, a delivery protocol, encapsulates a payload that complies with a different protocol. By using tunneling one can carry a payload (for example, 64B) over an incompatible delivery-network, or provide a secure path through an untrusted network. There are various examples of tunneling in today's networking environments. For example, use of a Generic Routing Encapsulation (GRE) protocol that runs over the Internet Protocol (IP) IP may be used to carry IP packets, with private addresses, and uses delivery packets with public IP addresses. Another example of tunneling includes the use of an Internet Protocol Security (IPSec) tunnel in a Virtual Private Network (VPN).

FIG. 1C shows an example of a tunneled packet 65 that includes a tunnel header 66, a tunnel CRC 68 and packet 64 with its own header 64A, data 64B and CRC 64C. The tunnel packet 65 has its own offset value 74, and packet 64, when encapsulated, has an offset value 76 within the encapsulated packet 65.

Tunneling protocols and standards continue to develop and evolve. Tunneling serves a useful purpose in network transmission because one is able to navigate using multiple and sometimes incompatible protocols.

Figure 1D:
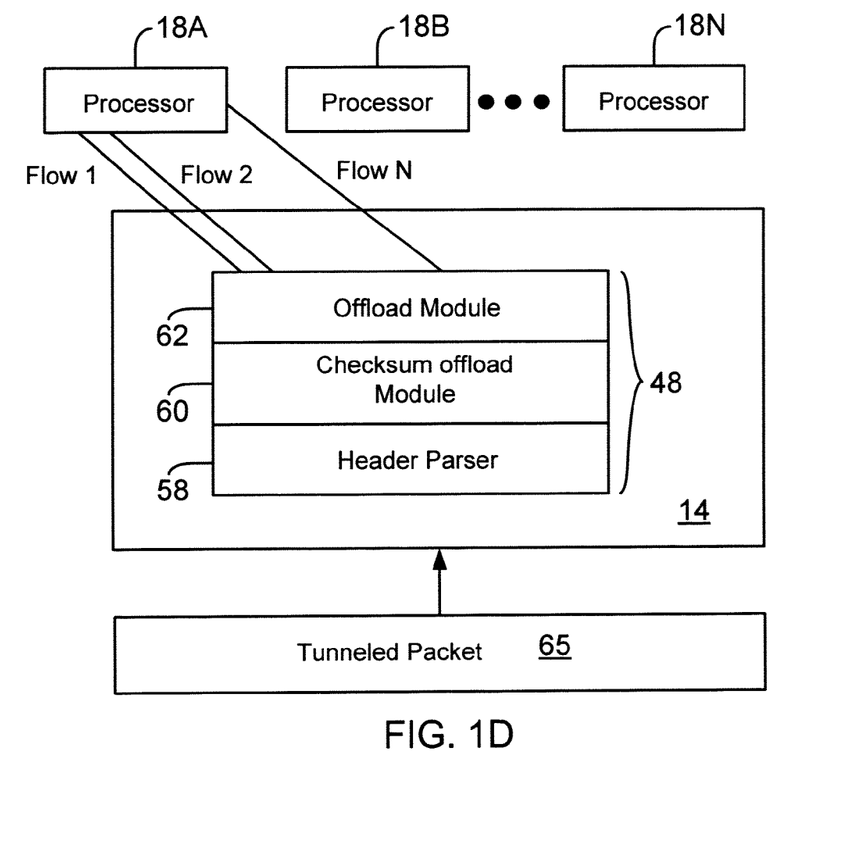
FIG. 1D shows an example of a conventional structure for handling tunneling.

Tunneling however poses a challenge for devices that typically use an offload functionality/module. FIG. 1D shows an example of how tunneling impacts offload functionality. Adapter 14 receives the tunneled packet 65 with tunnel header 66, tunneling CRC 68, and packet 64, as described above with respect to FIG. 1C. Header parser 58 and checksum offload module 60 are not able to pre-process packet 65 because they are not able to determine packet offset 76.

The tunneled packet 65 is sent to offload module 62 via the header parser 58 and checksum offload module 60. The offload module 62 is also not able to perform a hashing function on tunnel header 64, because it may not recognize the tunnel header 66 and may not be aware of packet offset 76. Because offload module 62 is not able to perform the hashing function, it may forward tunneled packets to the same processor, for example, processor 18A. This results in improper load balancing because processor 18A is burdened by various tunneled packets, while other processors do not receive any tunneled packets.

Figure 1E:
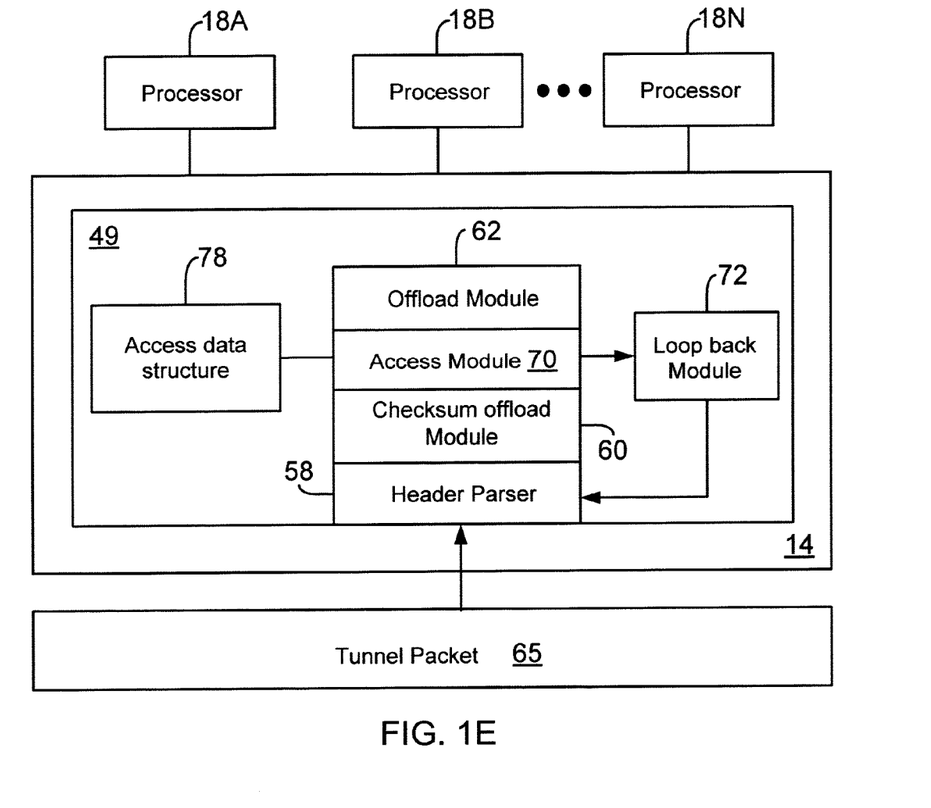
FIG. 1E shows an example of an offload system for handling tunneling, according to one embodiment.

FIG. 1E shows an offload system 49 for handling tunneled packets, according to one embodiment. Like offload system 48, offload system 49 includes header parser 58, checksum offload module 60 and offload module 62 that perform the same functions as described above for offload system 48. Offload system 49 further includes an access module 70 and loopback module 72 that are now described in detail.

Access module 70 maintains a data structure 78 at a memory device (not shown) that is used to verify a tunnel header (e.g. tunnel header 66) and obtain offset value 76 associated with the tunnel header. In one embodiment, the memory device for storing data structure 78 may be a tertiary content addressable memory (TCAM).

Figure 1F:
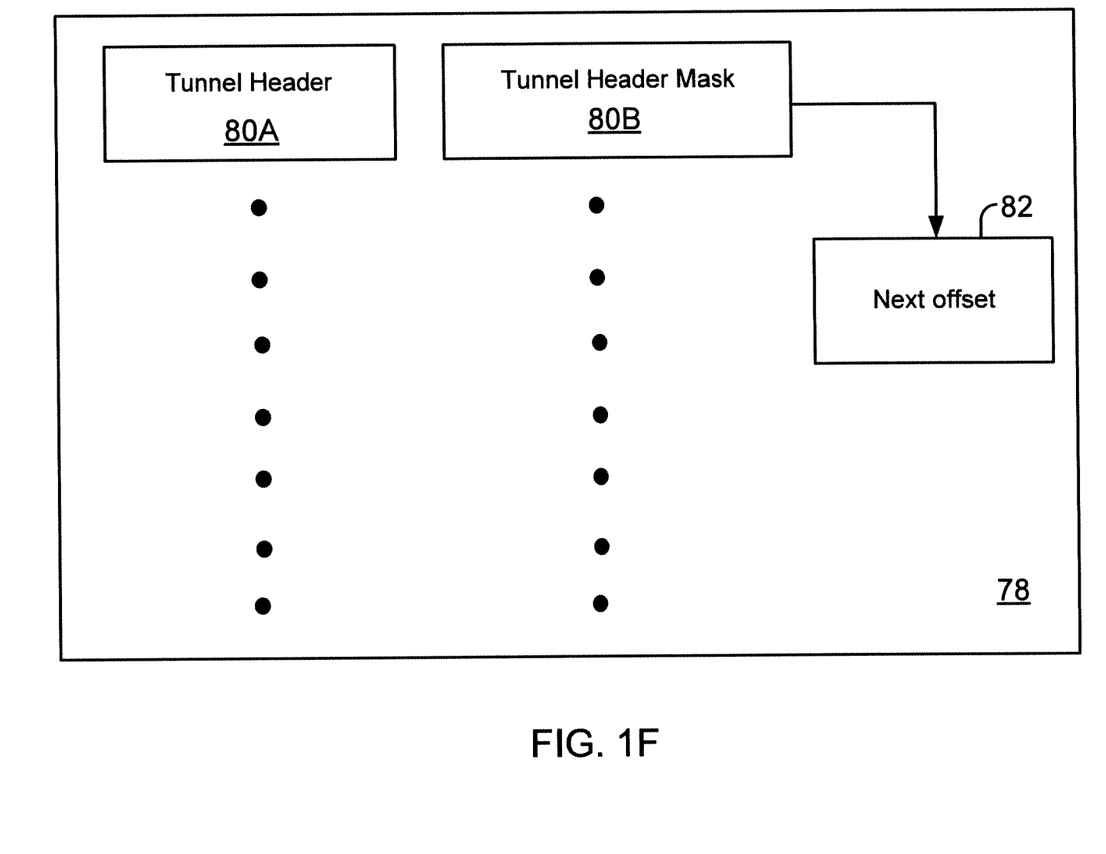
FIG. 1F shows an example of a data structure used by the offload system of FIG. 1E, according to one embodiment.

FIG. 1F provide an example of data structure 78 that may include columns 80A, 80B. Column 80A stores a plurality of tunnel header entries. The tunnel headers may be used to encapsulate packet 64. The tunnel headers may be stored as part of a machine implemented configuration process. Column 80A may be updated as new headers are added and previously used tunnel headers are discontinued.

Column 80B stores tunnel header mask entries that provide a pointer 82 to packet offset value 76. In some instances, multiple pointer entries may be used to determine packet offset value 76.

When packet 65 is received, access module 70 compares the received tunnel header 64 with the tunnel header entries stored at data structure 78. If there is a match with a stored value, then pointer 82 is provided from column 80B. The pointer points to a "next offset value," which may be packet offset 76.

Once packet offset 76 is determined by access module 70, the loopback module 72 sends the tunnel packet 65 back to header parser 58 with the offset value so that it can parse packet header 64A. The checksum offload module 60 also determines the checksum. Thereafter, the offload module 62 performs the offload function.

Thus, using access module 70 with data structure 78 and the loop back module 72, adapter 14 is able to support both tunneling and offload functionality. A process 200 for handling tunneled packets is now described below with respect to FIG. 2.

Figure 2:
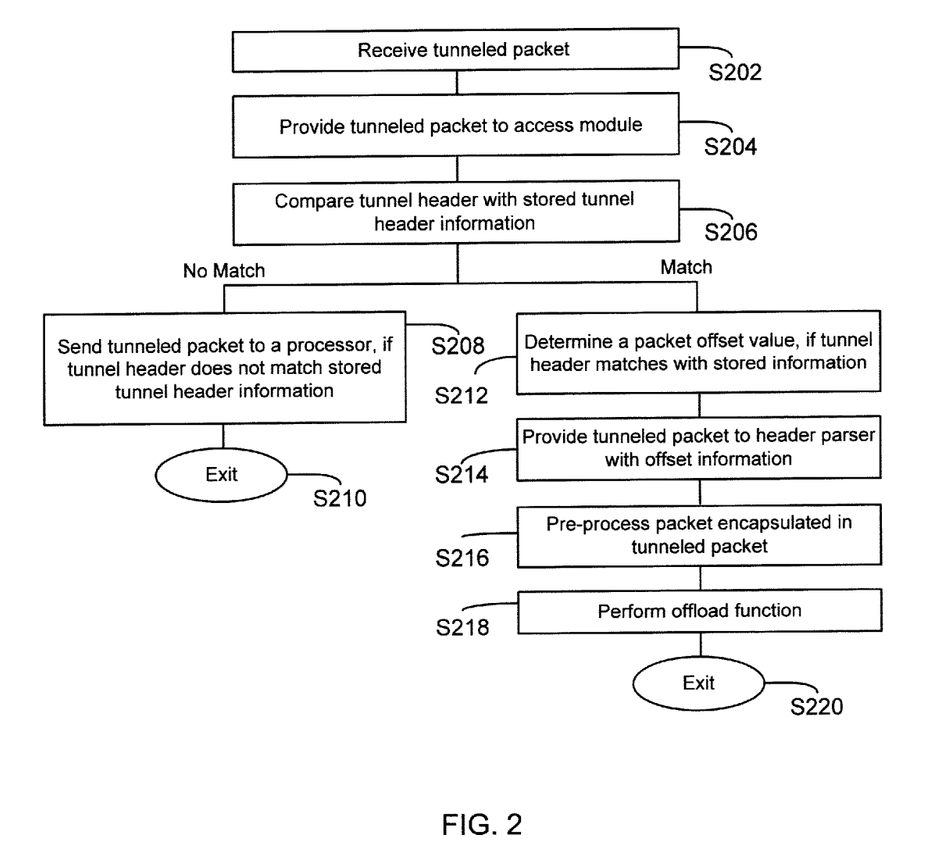
FIG. 2 is a process flow diagram for using tunneling and offloading, according to one embodiment.

Process 200 begins in block S202, when a tunneled packet 65 with tunnel header 66, packet 64, and tunnel CRC 68 is received by adapter 14 for a particular connection or otherwise. Header parser 58 and the checksum offload module 60 are not able to parse the header or determine the checksum of the tunneled packet 66, because they may not be aware of packet offset 76. Therefore, the tunneled packet 65 is passed on to access module 70 in block S204.

In block S206, access module 70 uses data structure 78 to determine if tunnel header 66 matches any of the entries within column 80A. Access module 70 compares tunnel header 66 with stored TCAM entries. If there is no match, then in block S208, the tunneled packet 65 is sent to one of the processors 18A-18N. Thereafter, the process ends in block 5210.

However, if there is a match in block 5206, then in block 5212, access module determines the offset 76 for packet header 64A, as shown in FIGS. 1E and 1F and described above.

Once the packet header offset 76 is known, access module 70 sends the tunnel packet 65 to header parser 58 via loopback module 72 in block 5214. Because the packet offset 76 becomes known, header parser 58 and checksum module 60 pre-process packet 64 in block 5216. The pre-processing involves parsing header 64A and performing a checksum. The pre-processed packet is then provided to offload module 62. The offload module 62 then performs the offload function in block S218. In this example, the offload module 62 performs a hashing function to select a processor from among the processors 18A-18N for processing data 64B of packet 64. Thereafter, the process ends in block 5220.

In one embodiment, using access module 70 and loop back module 72, one is able to process a tunneled packet and perform an offload functions. This allows system 10 to leverage both tunneling and offloading certain functions to offload module 48.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
receiving a tunneled packet at a network device, the tunneled packet having a tunnel header, the tunnel header encapsulating a packet, the packet having a packet header and a payload;
determining an offset value for the packet header by comparing the tunnel header to a plurality of entries stored at a data structure maintained by the network device, wherein the data structure is used for obtaining the offset value associated with the tunnel header;
if the tunnel header matches one of the stored tunnel header entries, providing a pointer corresponding to the matched tunnel header entry, wherein the pointer points to the offset value that is equal to a packet offset of the tunneled packet;
sending, by a loopback module of the network device, the tunneled packet to a header parser of the network device with the offset value;
parsing, by the loopback module, the packet header;
using the offset value for pre-processing the packet; and
a hardware based offload module performing an offload function.

2. The method of claim 1, wherein the network device is an adapter configured to handle network traffic.

3. The method of claim 1, wherein the network device is an adapter configured to handle storage traffic.

4. The method of claim 1, wherein the network device is an adapter configured to handle both network and storage traffic.

5. The method of claim 1, wherein an access module compares the tunnel header with the plurality of entries to determine the offset.

6. A network device coupled to a computing system, the network device comprising:
a hardware based offload system having a header parser for receiving a tunneled packet, the tunneled packet having a tunnel header, the tunnel header encapsulating a packet having a packet header and a payload;
an access module for determining an offset value for the packet header by comparing the tunnel header to a plurality of entries stored at a data structure maintained at the network device, wherein the data structure is used for obtaining the offset value associated with the tunnel header; wherein the header parser uses the offset value for pre-processing the packet; and
an access module for determining an offset value for the packet header by comparing the tunnel header to a plurality of entries stored at a data structure maintained at the network device, wherein the data structure is used for obtaining the offset value associated with the tunnel header, wherein if the tunnel header matches one of the stored tunnel header entries, a pointer is provided corresponding to the matched tunnel header entry, wherein the pointer points to the offset value that is equal to a packet offset of the tunneled packet; wherein the header parser uses the offset value for pre-processing the packet; a loopback module of the network device for sending the tunneled packet to the header parser with the offset value and for parsing the packet header; and
an offload module for performing an offload function.

7. The network device of claim 6, wherein the network device is an adapter configured to handle network traffic.

8. The network device of claim 6, wherein the network device is an adapter configured to handle storage traffic.

9. The network device of claim 6, wherein the network device is an adapter configured to handle both network and storage traffic.

10. A system, comprising:
a computing system interfacing with a network device, the network device comprising:
a hardware based offload system having a header parser for receiving a tunneled packet at a network device, the tunneled packet having a tunnel header, the tunnel header encapsulating a packet having a packet header and a payload;
an access module for determining an offset value for the packet header by comparing the tunnel header to a plurality of entries stored at a data structure maintained at the network device, wherein the data structure is used for obtaining the offset value associated with the tunnel header, wherein if the tunnel header matches one of the stored tunnel header entries, a pointer is provided corresponding to the matched tunnel header entry, wherein the pointer points to the offset value that is equal to a packet offset of the tunneled packet; wherein the header parser uses the offset value for pre-processing the packet;
a loopback module of the network device for sending the tunneled packet to the header parser with the offset value and for parsing the packet header; and
an offload module for performing an offload function.

11. The system of claim 10, wherein the network device is an adapter configured to handle network traffic.

12. The system of claim 10, wherein the network device is an adapter configured to handle storage traffic.

13. The system of claim 10, wherein the network device is an adapter configured to handle both network and storage traffic.

14. A machine implemented method, comprising:
receiving a tunneled packet at a network device;
comparing, by an access module of the network device, a tunnel header of the received packet with a plurality of tunnel header entries stored at a data structure accessible to the network device, wherein the data structure is used for obtaining an offset value associated with the tunnel header;
if the tunnel header matches one of the stored tunnel header entries, providing a pointer corresponding to the matched tunnel header entry, wherein the pointer points to the offset value that is equal to a packet offset of the tunneled packet;
sending, by a loopback module of the network device, the tunneled packet to a header parser of the network device with the offset value;
parsing, by the loopback module, the packet header;
determining, by a checksum offload module of the network device, a checksum for the tunneled packet; and
performing, by an offload module of the network device, an offload function.

15. The method of claim 14, wherein the network device is an adapter configured to handle network traffic.

16. The method of claim 14, wherein the network device is an adapter configured to handle storage traffic.

17. The method of claim 14, wherein the network device is an adapter configured to handle both network and storage traffic.

* * * * *